United States Patent [19]
Tuttle et al.

[11] Patent Number: 5,963,177
[45] Date of Patent: Oct. 5, 1999

[54] METHODS OF ENHANCING ELECTRONMAGNETIC RADIATION PROPERTIES OF ENCAPSULATED CIRCUIT, AND RELATED DEVICES

[75] Inventors: Mark E. Tuttle, Boise; Rickie C. Lake, Eagle, both of Id.

[73] Assignee: Micron Communications, Inc., Boise, Id.

[21] Appl. No.: 08/858,026

[22] Filed: May 16, 1997

[51] Int. Cl.⁶ ................................................... H01Q 1/42
[52] U.S. Cl. .......................... 343/872; 343/741; 343/866; 340/505; 340/825.54
[58] Field of Search .................................... 343/741, 742, 343/866, 867, 872; 342/51; 340/505, 572, 825.54; 29/600

[56] References Cited

U.S. PATENT DOCUMENTS

| | | | |
|---|---|---|---|
| 4,075,632 | 2/1978 | Baldwin et al. | 343/6.8 |
| 4,926,182 | 5/1990 | Ohta et al. | 342/44 |
| 5,432,027 | 7/1995 | Tuttle et al. | 429/127 |
| 5,480,462 | 1/1996 | Tuttle | 29/623.5 |
| 5,486,431 | 1/1996 | Tuttle et al. | 429/66 |
| 5,494,495 | 2/1996 | Tuttle | 29/623.2 |
| 5,536,596 | 7/1996 | Lake | 429/162 |
| 5,542,959 | 8/1996 | Tuttle | 29/623.3 |
| 5,547,781 | 8/1996 | Blonsky et al. | 429/174 |
| 5,552,790 | 9/1996 | Gunnarsson | 342/51 |
| 5,580,674 | 12/1996 | Tuttle et al. | 429/66 |
| 5,584,891 | 12/1996 | Tuttle | 29/623.1 |
| 5,608,417 | 3/1997 | De Vall | 343/867 |
| 5,621,412 | 4/1997 | Sharpe et al. | 342/51 |
| 5,649,296 | 7/1997 | MacLellan et al. | 455/38.2 |
| 5,825,291 | 10/1998 | Platt et al. | 343/742 |

FOREIGN PATENT DOCUMENTS 0 704 816 A2  4/1996  European Pat. Off. .

*Primary Examiner*—Don Wong
*Assistant Examiner*—Tan Ho
*Attorney, Agent, or Firm*—Wells, St. John, Roberts, Gregory & Matkin P.S.

[57] ABSTRACT

Methods of forming electronic signal transmitting/receiving devices and electronic signal transmitting/receiving devices are described. In one implementation, integrated circuitry including transponder circuitry is provided and operatively coupled with an antenna to provide a transmitting/receiving circuit. A matrix material comprising suspension structure is formed and applied over at least a portion of the antenna, the suspension structure being selected to manipulate an operating characteristic of the transmitting/receiving circuit. According to a preferred aspect of the invention, the operating characteristic comprises an electrical length of the antenna and the application of the matrix material effectively increases the electrical length to resonate the antenna at a desired frequency. According to another preferred aspect of the invention, the suspension structure comprises calcium carbonate.

49 Claims, 5 Drawing Sheets

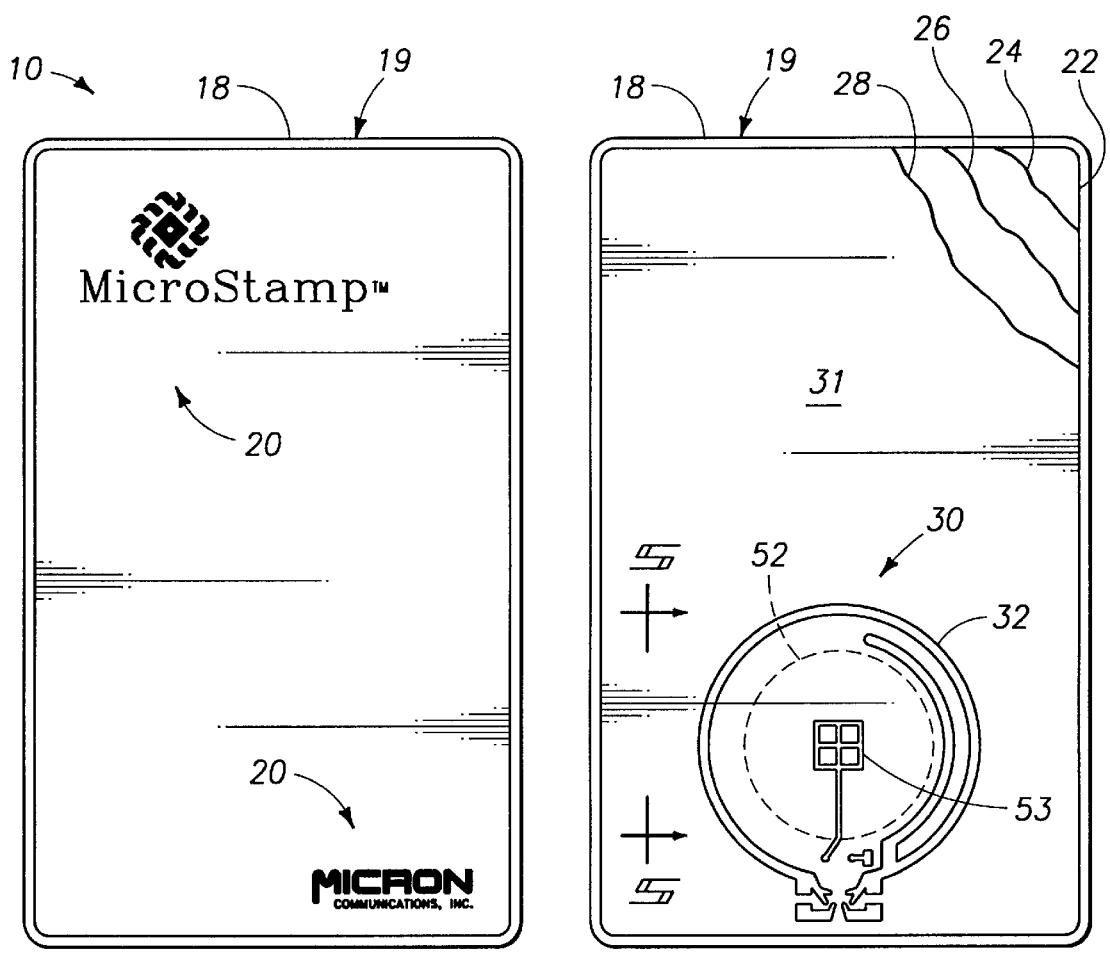
_Fig 1_
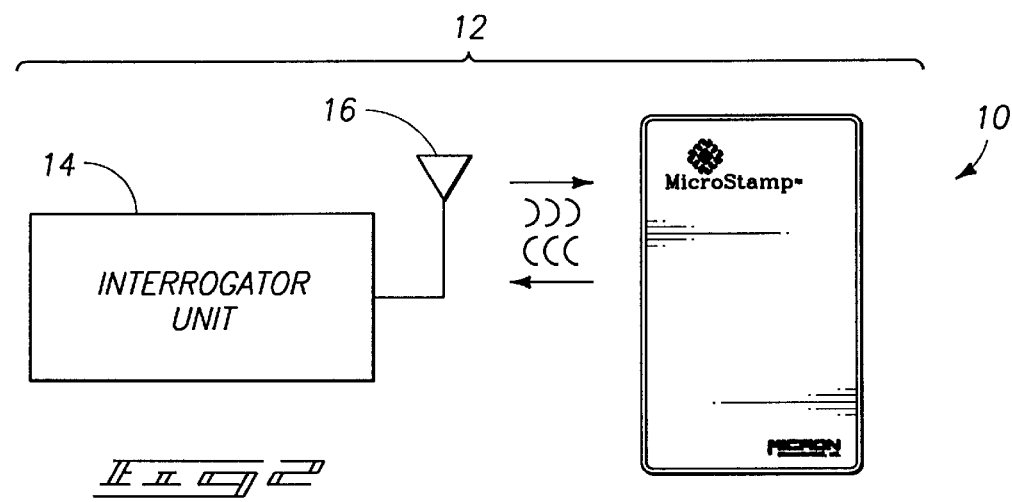
_Fig 2_

| 75mil | 90mil | 125mil | |
|---|---|---|---|
| 2.51 | 2.38 | 2.39 | ENCAPSULATING MATERIAL A |
| 2.36 | 2.36 | 2.31 | ENCAPSULATING MATERIAL B |

85mm LENGTH
TABLE 1

| 75mil | 90mil | 125mil | |
|---|---|---|---|
| 2.33 | 2.38 | 2.35 | ENCAPSULATING MATERIAL A |
| 2.37 | 2.28 | 2.25 | ENCAPSULATING MATERIAL B |

90mm LENGTH
TABLE 2

| 75mil | 90mil | 125mil | |
|---|---|---|---|
| 2.35 | 2.26 | 2.25 | ENCAPSULATING MATERIAL A |
| 2.33 | 2.25 | 2.15 | ENCAPSULATING MATERIAL B |

95mm LENGTH
TABLE 3

FIG. 8

＃ METHODS OF ENHANCING ELECTROMAGNETIC RADIATION PROPERTIES OF ENCAPSULATED CIRCUIT, AND RELATED DEVICES

TECHNICAL FIELD

This invention relates to methods of enhancing electromagnetic radiation properties of encapsulated circuits, and related devices. More particularly it concerns methods of forming electronic signal transmitting/receiving devices and radio frequency transmitting/receiving devices. Exemplary devices include those which are configured to transmit microwave backscatter.

BACKGROUND OF THE INVENTION

As antennas are implemented on an ever-broader range of communications devices, there is a continuous need to provide antenna implementations that realize a desired signal sensitivity, both in transmitting and receiving modes. The desired signal sensitivity of an antenna is related to the dimension of the antenna, and more particularly, to the antenna's length. As communications devices grow ever smaller, there is an increasing need to provide antennas which are suitable for operation relative to frequencies which are associated with lengths of antennas which are too cumbersome to use with reduced-sized devices.

To produce optimum operation of a particular antenna, it may be tuned to resonate at a desired frequency. Such tuning has traditionally taken place in the form of the addition of inductive and/or capacitative elements relative to the antenna to either lengthen or shorten the antenna's electrical length. The antenna's electrical length is a length which is desired insofar as it's association with a particular resonant frequency.

This invention grew out of concerns associated with manipulating or controlling the electromagnetic radiation (EMR) properties of communications devices, and particularly radio frequency (RF) tag devices. This invention also grew out of concerns associated with controlling the EMR properties of communications devices, and particularly radio frequency tag devices which are configured to transmit microwave backscatter having frequencies greater than 1 GHz. This invention also grew out of concerns associated with controlling the EMR properties of radio frequency tag devices independently of associated integrated circuitry and/or tag device package dimensions.

SUMMARY OF THE INVENTION

Methods of forming electronic signal transmitting/receiving devices and electronic signal transmitting/receiving devices are described. In one implementation, integrated circuitry including transponder circuitry is provided and operatively coupled with an antenna to provide a transmitting/receiving circuit. A matrix material comprising a suspension structure is formed and applied over at least a portion of the antenna, the suspension structure being selected to manipulate an operating characteristic of the transmitting/receiving circuit. According to a preferred aspect of the invention, the operating characteristic comprises an electrical length of the antenna and the application of the matrix material effectively increases or decreases the electrical length to resonate the antenna at a desired frequency. According to another preferred aspect of the invention, the suspension structure comprises calcium carbonate.

BRIEF DESCRIPTION OF THE DRAWINGS

Preferred embodiments of the invention are described below with reference to the following accompanying drawings.

FIG. 1 shows front and rear elevational views of an electronic signal transmitting/receiving device at an intermediate processing step in accordance with the invention.

FIG. 2 shows one radio frequency communication system of which the FIG. 1 device constitutes a part.

FIG. 8 shows three tables in which experimental results are set forth.

DETAILED DESCRIPTION OF THE PREFERRED EMBODIMENTS

Figure 3:
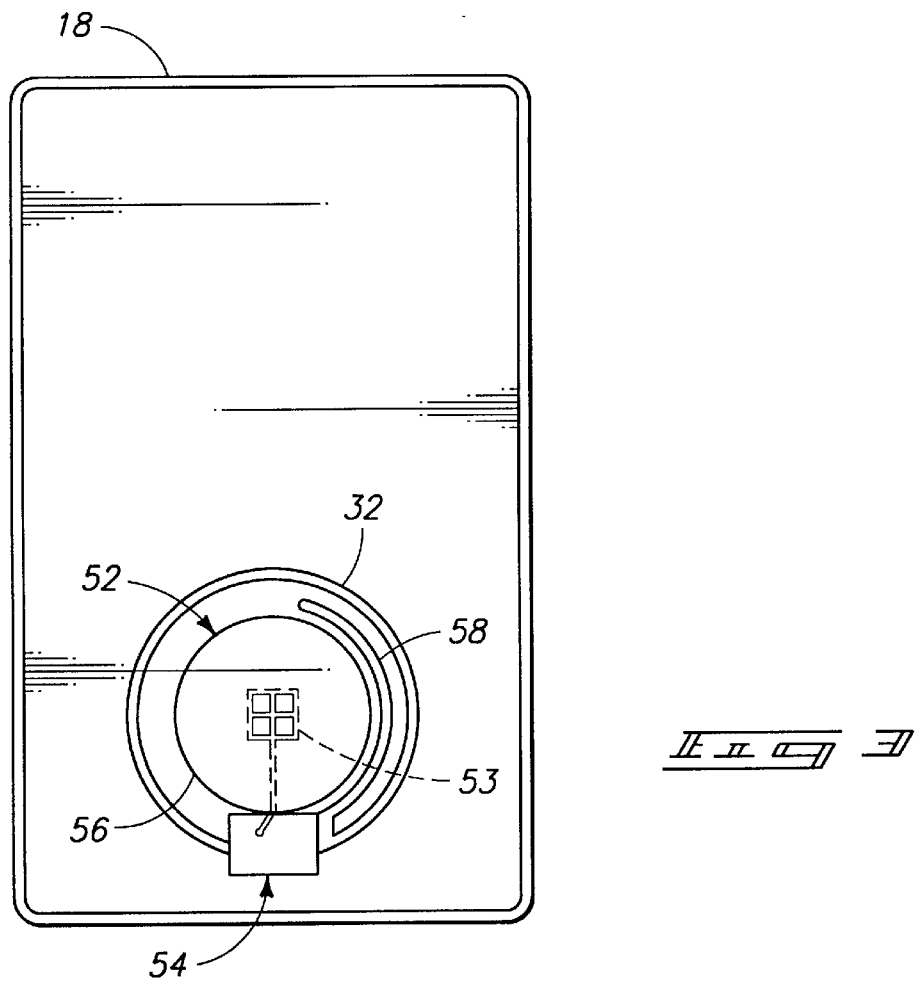
FIG. 3 is a rear elevational view of the FIG. 1 device at a processing step subsequent to that shown in FIG. 1.

This disclosure of the invention is submitted in furtherance of the constitutional purposes of the U.S. Patent Laws "to promote the progress of science and useful arts" (Article 1, Section 8).

Referring to FIGS. 1 and 2, a radio frequency receiving/transmitting device in an intermediate state of assembly is shown generally at 10 and comprises a card or stamp which is designed to receive and transmit radiation or radio frequency (RF) signals in a desired range of frequencies. The terms "transmit" and "transmission" as used herein, as such pertain to the transmission of electronic signals or radio frequency waves shall be understood to mean those signals or waves which are self-generated by device or card 10, or those signals or waves which are reflected or backscattered by the device and which originate at a location remote from the device. The left-most FIG. 1 view shows the front portion of a finished device or card 10 and the right-most view shows the underside of a device or card with a portion removed to show detail.

In the illustrated example FIG. 2, device 10 comprises part of a radio frequency communication system 12. Typical systems include an operator, such as the illustrated interrogator unit 14 which is useful for generating an electronic signal which is conveyed to device 10 whereupon the device detects the signal and then transmits a return signal to the interrogator unit. An electromagnetic signal passing antenna 16 is typically connected with interrogator unit 14 and facilitates transmission and reception of appropriate signals. Ordinarily, device or card 10 is carried by or mounted upon an object and contains an identification or data concerning the object. Device or card 10 can also be carried by an individual. Device 10 receives the signal transmitted by interrogator unit 14, and responsive thereto transmits a signal back to the interrogator unit. Device 10 can generate a responsive signal to be transmitted to interrogator unit 14 or may receive and transmit so-called backscatter microwave radiation to the interrogator unit. An exemplary radio frequency communication system is described in U.S. patent application Ser. No. 08/705,043, which names James O'Toole, John R. Tuttle, Mark E. Tuttle, Tyler Lowrey, Kevin Devereaux, George Pax, Brian Higgins, Shu-Sun Yu, David Ovard and Robert Rotzoll as inventors, which was filed on Aug. 29, 1996, is assigned to the assignee of this patent application, and is fully incorporated herein by reference.

Device or card 10 includes a substrate or layer of supportive material 18. The term "substrate" as used herein refers to any supporting or supportive structure, including, but not limited to, a supportive single layer of material or multiple layer constructions. Substrate 18 preferably comprises a polyester film having a thickness of around 5 mils. Other materials are possible.

In one processing regime, substrate or layer 18 is suitable for supporting various layers of inks which include at least one conductive ink which is useful for forming printed-on circuitry connections which are described below. In the illustrated example, supported inks can be used to convey information such as logos and/or company names such as those illustrated at 20 which are respectively, the name of a product incorporating the inventive subject matter described below and the assignee of this patent application.

Following the application, if any, of logos or company names 20, a plurality of layers of ink are provided or formed over substrate 18 directly atop any such logos or company names. Exemplary ink layers are broken or peeled away at 22, 24, 26, and 28 in the right-most FIG. 1 view. More or less layers can, of course, be used.

After provision of exemplary layers 22 through 28, a conductive ink 30 is formed or applied over substrate 18 directly atop layer 28 and surface 31. A preferred conductive ink comprises silver ink. One manner of forming or applying the conductive ink on the substrate is to screen print the ink on the substrate through conventional techniques. The conductive ink both forms desired electrical connections with and between electronic componentry which will be described below and provides an antenna 32 which is suitable for receiving and transmitting electronic signals or RF energy. The illustrated antenna constitutes a loop antenna. Substrate 18 includes a perimetral edge region or outer periphery 19 inside of which a portion, and preferably the entire antenna extends or lies. Other antenna constructions are possible.

Referring to FIG. 3, a battery or power source 52 is provided and mounted on substrate 18 via conductive epoxy. Battery 52 is preferably a thin profile battery. Thin profile batteries are described in U.S. Pat. No. 5,547,781 issued Aug. 20, 1996; U.S. Pat. No. 5,432,027 issued Jul. 11, 1995; U.S. Pat. No. 5,486,431 issued Jan. 23, 1996; U.S. Pat. No. 5,480,462 issued Jan. 2, 1996; U.S. Pat. No. 5,494,495 issued Feb. 27, 1996; U.S. Pat. No. 5,536,596 issued Jul. 16, 1996; U.S. Pat. No. 5,580,674 issued Dec. 3, 1996; U.S. Pat. No. 5,542,959 issued Aug. 6, 1996; and U.S. Pat. No. 5,584,891 issued Dec. 17, 1996, all of which are assigned to the assignee of this patent application and all of which are expressly incorporated by reference herein. Battery 52 makes electrical contact with a first battery connection terminal 53.

An integrated circuit 54 is provided and includes suitable circuitry including transponder circuitry for receiving, processing, transmitting and/or otherwise operating upon electronic signals. Integrated circuitry 54 is preferably in the form of a semiconductor chip which is operatively mounted relative to substrate 18 and in electrical contact with battery 52 via the previously applied conductive ink. An exemplary and preferred integrated circuitry package is described in U.S. patent application Ser. No. 08/705,043 incorporated by reference above.

Battery 52 includes a perimetral edge 56 which is disposed adjacent a second battery connection terminal 58. Subsequently, conductive epoxy is dispensed relative to battery perimetral edge 56 and makes electrical contact with battery connection terminal 58. The conductive epoxy is then cured. The application of the above-described conductive ink onto the substrate, together with the application of conductive epoxy thereon and subsequent affixation of the integrated circuitry and power source relative to the antenna constitutes operably connecting the same relative to a supportive substrate.

Figure 4:
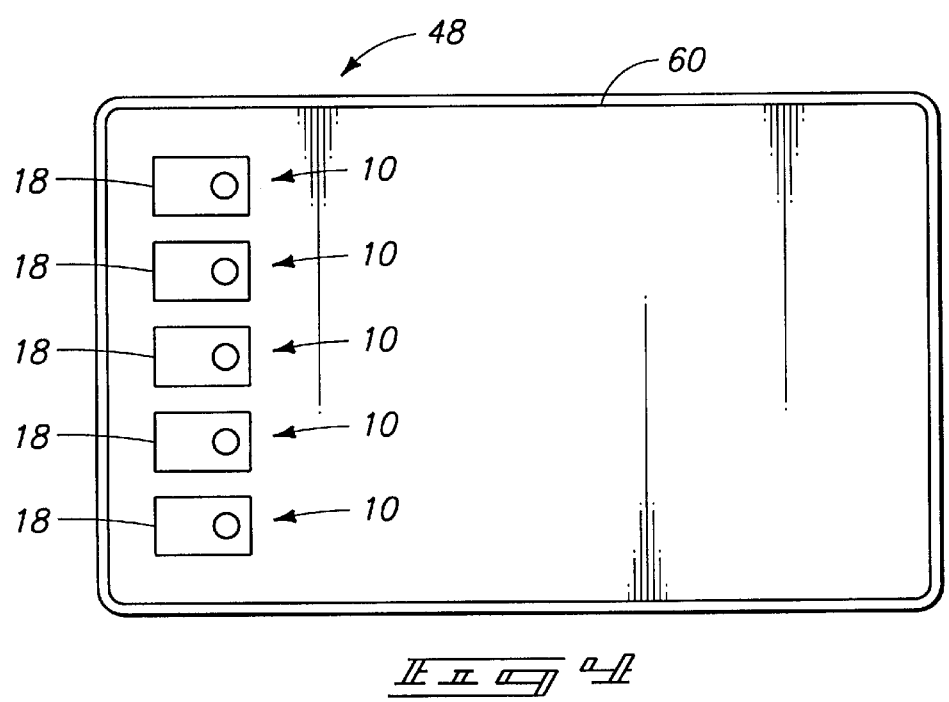
FIG. 4 is a top plan view of a panel of material which supports a plurality of the FIG. 1 devices during processing in accordance with the invention.

Referring to FIG. 4, and in accordance with one implementation, a sheet or panel 48 (which supports a plurality of substrates 18), undergoes processing in which an amount of adhesive material 60 is applied around a perimeter edge of the sheet or panel. Such applied adhesive material forms a dam relative to and inside of which encapsulating epoxy material is to be formed. Subsequently, encapsulating epoxy material is formed over sheet 48 to encapsulate each of substrates 18. In the illustrated example, such epoxy constitutes a two-part epoxy having a resin and a hardener which are sufficient to provide a desired degree of rigidity. After application and curing of such epoxy, sheet or panel 48 is subjected to suitable separation or singulation processing in which individual devices 10 are cut and separated from one another.

Figure 5:
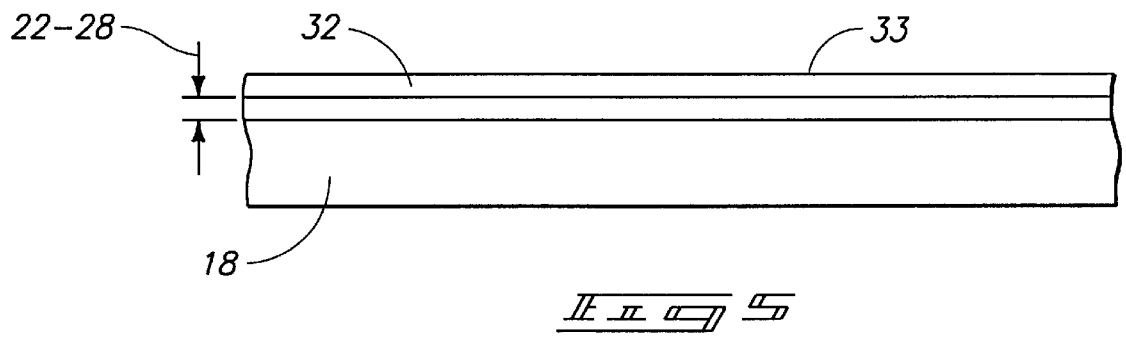
FIG. 5 is a view taken along line 5—5 in FIG. 1 and shows various elevational layers of the FIG. 1 device at an intermediate processing step.
Figure 6:
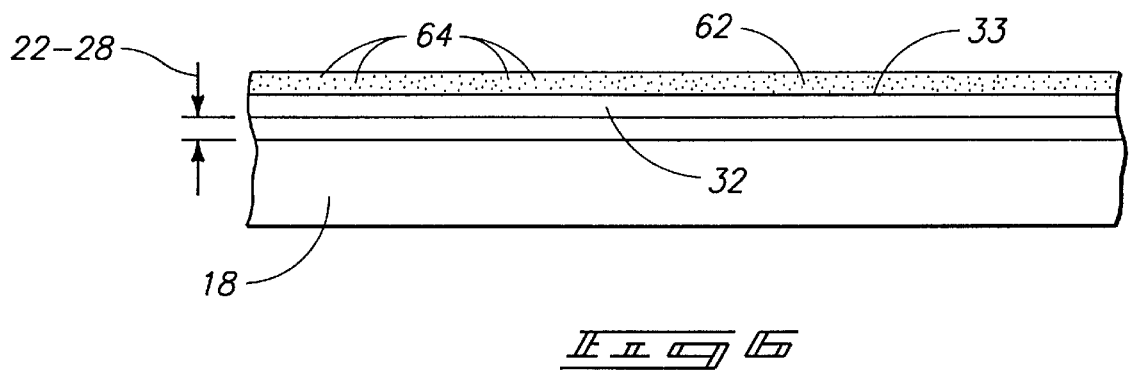
FIG. 6 is a view of the FIG. 5 elevational layers and shows an additional layer provided thereover in accordance with the invention.

Referring to FIGS. 5 and 6, fragmentary portions of substrate 18 are illustrated after the antenna 32, battery 52, and integrated circuitry 54 have been provided. FIG. 5 shows the substrate before provision of the encapsulating epoxy material, and FIG. 6 shows the substrate after provision of the encapsulating material. Accordingly, antenna 32 has been operatively coupled with the integrated circuitry 54 to define a transmitting/receiving circuit.

The discussion immediately below concerns selection of suitable antenna and/or card or device parameters or dimensions, given certain variables with which the inventive methodology contends. Exemplary variables include antenna length, desired antenna resonant frequency, card or device thickness, and matrix encapsulating material as such pertains to the dielectric constant of the same. The discussion proceeds with reference to FIGS. 5–8.

Referring to FIG. 8, three tables are set forth which indicate exemplary experimental results which relate to antenna resonant frequencies. The tables are intended to illustrate certain relationships between variables including antenna lengths, dielectric materials, and device or card thicknesses, and the effects each have on a particular resonant frequency. Specifically, the tables are intended to indicate the effects that manipulation of one or more of these variables have on the ability to achieve a desired resonant frequency.

Each of the tables presents experimental data for a different exemplary length of antenna. Table 1 constitutes experimental data for an antenna having a length of 85 mm; Table 2 constitutes experimental data for an antenna having a length of 90 mm; and, Table 3 constitutes experimental data for an antenna having a length of 95 mm.

Individual tables include resonant frequency measurements (in GHz) as a function of two variables, i.e. device or card thickness (75 mils, 90 mils, and 125 mils), and encapsulating material (A or B). Encapsulating material A comprises a material having a lower dielectric constant relative to encapsulating material B.

Describing some exemplary relationships which can be ascertained by examination of Tables 1, 2, and 3, it can first be seen that as the card or device thickness increases relative to a particular length of antenna, the associated resonant frequency generally decreases. For example, referring to Table 1, for either of the encapsulating materials A or B, as the device thickness increases from 75 mils to 125 mils, the resonant frequency generally decreases. Although, there appears to be a slight increase for encapsulating material A relative to the 90 mil and 125 mil thicknesses; and, there appears to be no change for encapsulating material B for the 75 mil and 90 mil thicknesses. Notwithstanding these departures in the data, the trend is as mentioned above in these examples.

It can also be seen that as the length of a particular antenna increases, the resonant frequency generally decreases. For example, for a device thickness of 125 mils, the 85 mm antenna has respective dielectric-dependent resonant frequencies of 2.39 GHz and 2.31 GHz; the 90 mm antenna has respective dielectric-dependent resonant frequencies of 2.35 GHz and 2.25 GHz; and, the 95 mm antenna has respective dielectric-dependent resonant frequencies of 2.25 GHz and 2.15 GHz.

It can further be seen that as the dielectric constant of the materials increase, the resonant frequency decreases. For example, in Table 1 each of the resonant frequencies for encapsulating material A (the lower dielectric constant of the two) are higher than the corresponding frequencies for encapsulating material B (the higher dielectric constant of the two). The above-described relationships generally hold true notwithstanding individual divergent results.

Hence, with the above relationships and interrelationships having been experimentally determined, suitable antenna lengths, encapsulating materials, and/or device or card thicknesses can be selected to achieve a desired resonant frequency. In the illustrated and preferred example, the resonant frequency of choice is 2.45 GHz. The actual antenna length, however, is limited by, among other things, the desired device or card dimensions. Because it is desired to make the device or card as small as possible, the actual length of the antenna is limited. Therefore, appropriate selection of device or card thickness and encapsulating material can be tailored to achieve a desired resonant frequency.

As provided, antenna 32 has an actual or first length which is defined by the amount/length of conductive ink 30 formed over substrate 18. The actual length of the antenna is the physical antenna length. The physical antenna length is limited by the dimensions of device 10. In the illustrated example, the antenna length is directly limited by the diameter of the thin-profile battery 52 due to the antenna's loop-like nature. An exemplary and preferred actual length is about 81.7 mm or around 82 mm. Other antenna constructions and antenna lengths are possible. As the dimensions of the device grow smaller, the area available for supporting an antenna grow correspondingly smaller as well. Antenna 32 also has an electrical length which is not necessarily the same as the actual length and is associated with the antenna's resonance characteristics. The electrical length of the antenna enables the antenna to resonate at a particular radio frequency. In the illustrated example, a desired radio frequency is a frequency between 200 MHz and 30 GHz, and preferably around 2.45 GHz.

It has been discovered, as discussed above, that through manipulation of the epoxy encapsulating material and the device or card thickness, the first or actual length of the antenna can be effectively changed or manipulated relative to an associated resonant frequency to achieve a desired effective second or electrical length which is suitable for resonating the antenna at a desired different frequency.

Referring now to FIGS. 5 and 6, antenna 32 includes an exposed antenna outer surface 33. A matrix encapsulating material 62 is formed over outer surface 33, and preferably all of the exposed outer surface. Matrix encapsulating material 62 preferably includes suspension structure 64 therewithin. Control of the suspension structure enables the electromagnetic characteristics of the antenna, and hence the transmitting/receiving circuitry to be manipulated. A preferred matrix material is formed from a resin material and hardener which are available from Epic Resin, Inc. of Palmyra, Wis. and discussed below in detail. Matrix material 62 is preferably applied over at least a portion of, and preferably all of antenna outer surface 33 thereby encapsulating the antenna. Such material also preferably encapsulates the circuit components mounted upon substrate 18 such that upon subsequent curing, a solid card or stamp is provided. The resultant card or stamp construction can be further processed to smooth the outer surfaces thereof including suitable abrading of such surfaces.

Suspension structure 64 constitutes a suspension of solid particles which are selected to achieve an antenna electrical length which is different than the antenna actual length. Such antenna electrical length is associated with resonance characteristics which are different from those associated with and achievable by the antenna actual length. As an example, and with the above-discussed variables in mind, i.e. antenna length, device thickness, and encapsulating material, it is desired in one implementation to provide a card or device which is as thin as possible. Based on the above, however, as the thickness of the device or card decreases, the resonant frequency increases. Such increases in resonant frequency may result in a frequency which is too high relative to the desired resonant frequency. Given that a particular device's dimensions control to a major extent the dimensions of the antenna, e.g. the antenna's actual length, the resultant antenna may only be physically capable of resonating at a frequency which is different or above the desired frequency. Thus, while it would be desirable to increase the antenna's actual length to achieve a lower resonant frequency, doing so is made difficult, if not impossible, due to the dimensions of the device. However, in light of the experimental results set forth in FIG. 8, selection of a suitable encapsulating material or device thickness can materially affect the frequency at which the antenna resonates. In this example, selection of a suitable encapsulating material or device thickness can lower the resonant frequency and effectively electrically lengthen or increase the antenna.

In the illustrated and preferred embodiment, the solid particles are selected to comprise a material, volume and density within the matrix which is effective to increase the antenna's electrical length. An exemplary constitution of a preferred matrix material includes the following: about 40% resin by weight of Epic Resin R3500 (unfilled) (the percentage can, however, range above or below 40%), 59% by weight $CaCO_3$ in a 50/50 mix of 3-micron particles and 12-micron particles, and 1% by weight $TiO_2$. Preferably, the density of suspension particles is around 1.72 $g/cm^3$. The above described resin mix constitutes a filled resin bearing an Epic Resin designator X95F2367. A preferred hardener for use with such filled resin is a hardener bearing an Epic Resin identification number of X97A2624 which, in turn, is a pre-blended mixture of hardener materials bearing Epic Resin identification numbers X96K2400 (75%) and H5064 (25%). The filled resin and hardener are mixed in a mixture ratio of 100:14 resin-to-hardener by weight. In the FIG. 8 example, encapsulating material A comprises filled resin X95F2367. Although a specific encapsulating material has been described, it is to be understood that other encapsulating materials comprising different constituents described above and below, can be utilized.

Epoxy encapsulant matrix material 62 constitutes a flowable coating material which is initially provided over antenna 32 and subsequently cured to provide a solid material matrix. Such provides a generally rigidified coating of material over substrate 18. Hence, in addition to enabling the manipulation of the device's electromagnetic characteristics, the material matrix provides mechanical stratification for the device.

Suspension structure 64 is selected to desirably manipulate an operating characteristic of the transmitting/receiving circuit defined by the antenna and integrated circuit. Such operating characteristic constitutes the electrical length of the antenna. Applying the matrix material over is the antenna as just described effectively increases the electrical length of the antenna such that upon cure thereof, the provided antenna resonates at a preferred frequency. According to one preferred aspect of the invention, the transmitting/receiving circuit is configured for processing radio frequencies of less than about 30 GHz. Even more preferably, the radio frequencies which are able to be processed by the transmitting/receiving circuit are in the range of about 3 GHz, with 2.45 GHz being preferred.

Although calcium carbonate ($CaCO_3$) was described above as a preferred filler material, other exemplary suspension structures can include one or more of the following: polyimide, $SiO_2$, fluoropolymer material such as Teflon, glass, titanium dioxide, calcium sulfate, and micro glass balloons. The individual exemplary suspension structures can be used separately, or in combination with other suspension structures. Such suspension structures provide desired filler material which achieves a desired electronic operating parameter, which in this invention constitutes the desired resonant frequency.

The provision and subsequent curing of epoxy encapsulant matrix material 62 constitutes packaging the antenna together with the integrated circuitry, battery and other components. Accordingly, such forms a package which, in the illustrated and preferred embodiment, constitutes a radio frequency receiving/transmitting device in the form of a card or stamp.

According to one preferred aspect of the invention, device or card 10 is configured for transmitting microwave backscatter relative to received microwave radiation from a source external of the card, such as interrogator unit 14 (FIG. 2). In a preferred embodiment, card or device 10 has at least one generally planar surface and a thickness transversely of the surface which is no greater than about 90 mils. In this implementation, the encapsulating material can be selected to achieve a dielectric constant of about 3.5. In another preferred embodiment, the thickness of the card or device is no greater than about 40 mils. In this implementation, the encapsulating material can be selected to achieve a dielectric constant of about 3.0. The thickness of the card or device can be of the order of no greater than about 30 mils, giving the card a thickness dimension similar to a standard credit card. Accordingly, suitable selection of an appropriate encapsulating material, as discussed above, can effectuate a desired resonant frequency.

Figure 7:
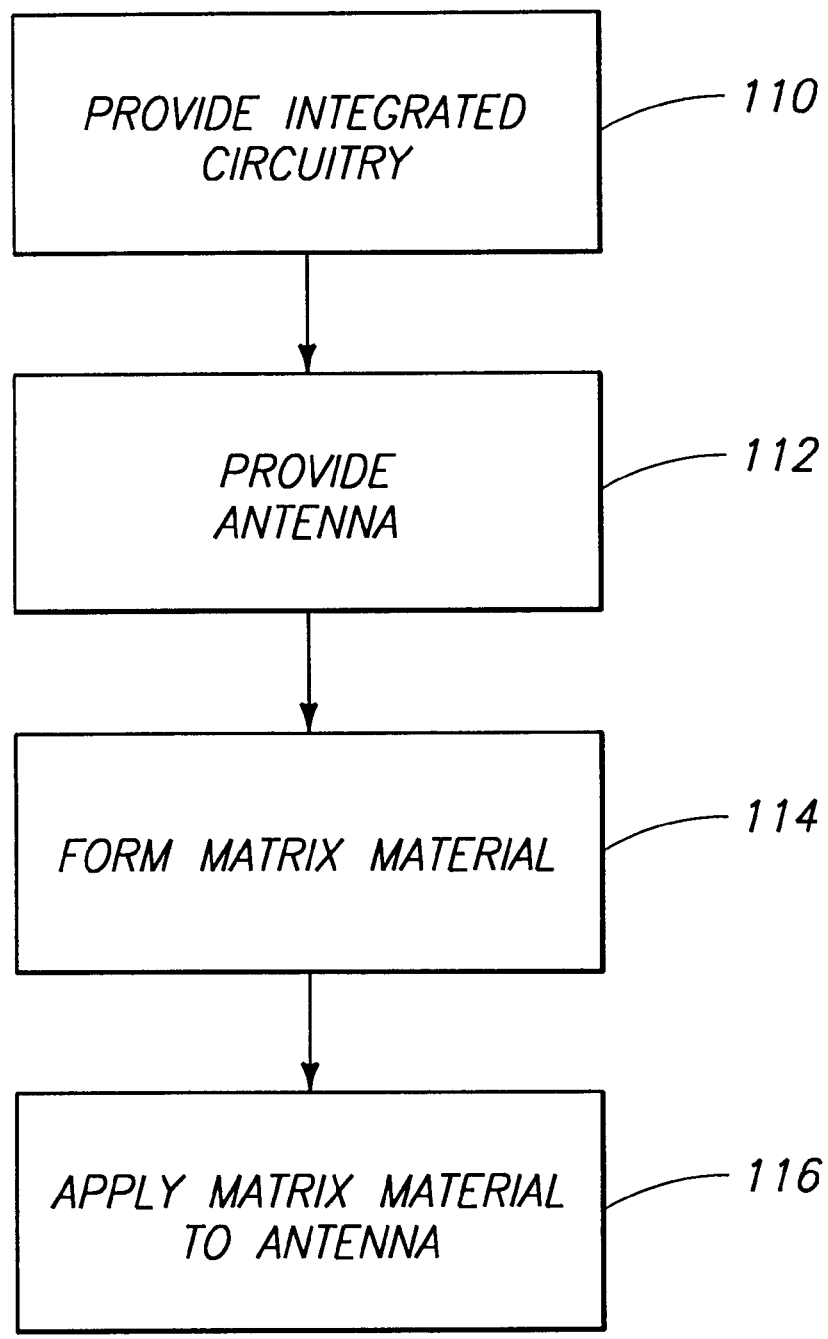
FIG. 7 is a flow diagram which illustrates certain methodical aspects of the invention.

Referring to FIG. 7, certain methodical aspects of the invention are set forth generally at 100. At box 110, integrated circuitry is provided. Such integrated circuitry is preferably suitable for processing RF signals which are generated at a location which is remote from card or device 10. Such integrated circuitry is described above and preferably constitutes an external integrated circuitry chip which is suitably operably mounted on substrate 18. Contemporaneously with the provision of the desired integrated circuitry, a power source or battery can be and preferably is provided and is utilized to power the chip. At box 112, an antenna is provided. In the illustrated and preferred embodiment discussed above, the antenna constitutes conductive material which is or can be screen printed on substrate 18 in advance of the mounting of the integrated circuitry chip and battery. Other printing techniques can be utilized such as pad printing, stencil printing, spray printing, needle dispensing, and the like. The conductive material can be suitably cured if necessary. Conductive adhesive is next applied over the substrate and the external components, i.e. the chip and battery, are suitably mounted thereon. At box 114, the preferred matrix material is formed. An exemplary thickness for such applied material is around 105- to 110 -mils. Before flowing the matrix material over the substrate however, appropriate selection and incorporation of the solid particles or filler materials into the matrix material discussed above will ensure that the resultant card or device construction possesses the desired resonance characteristics. At box 116, the matrix material is applied to the antenna, and preferably over the entirety of the substrate to a degree sufficient to coat the substrate. Subsequent curing of the matrix material provides a card or device with both sufficient mechanical properties, i.e. rigidity, flexibility, strength, and electromagnetic properties, i.e. desired resonance characteristics.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of forming an electronic signal transmitting/receiving device comprising:

providing an integrated circuit including transponder circuitry configured for processing electronic signals;

providing an antenna configured for transmitting/receiving electronic signals, the antenna being operatively coupled with the integrated circuit to define a transmitting/receiving circuit;

forming matrix material comprising suspension structure therewithin; and applying the matrix material over at least a portion of the antenna, the suspension structure being selected to manipulate at least one operating characteristic of the transmitting/receiving circuit.

2. The method of claim 1, wherein the at least one operating characteristic comprises an effective electrical length of the antenna.

3. The method of claim 1, wherein:

the at least one operating characteristic comprises an electrical length of the antenna; and the applying of the matrix material effectively increases the electrical length of the antenna.

4. The method of claim 1, wherein the transmitting/receiving circuit is configured for processing radio frequencies of less than about 30 GHz.

5. The method of claim 1, wherein the transmitting/receiving circuit is configured for processing radio frequencies of less than about 3 GHz.

6. The method of claim 1, wherein the suspension structure comprises calcium carbonate.

7. The method of claim 1, wherein the suspension structure is selected from the group consisting of: polyimide, $SiO_2$, fluoropolymer, glass, titanium dioxide, calcium carbonate, calcium sulfate, and micro glass balloons.

8. The method of claim 1, wherein the antenna is configured to transmit microwave backscatter.

9. A method of forming an electronic signal transmitting/receiving device comprising:
   providing an integrated circuit configured for processing electronic signals;
   operatively connecting an antenna with the integrated circuit, the antenna being configured for transmitting/receiving electronic signals;
   providing a matrix material;
   selecting at least one desired filler material to achieve a desired electronic operating parameter;
   adding said at least one desired filler material to said matrix material; and
   forming said matrix material with said at least one desired filler material over at least a portion of said antenna.

10. The method of claim 9, wherein the desired electronic operating parameter comprises a resonant frequency.

11. The method of claim 9, wherein the antenna is configured to transmit microwave backscatter.

12. The method of claim 9, wherein:
   the desired electronic operating parameter comprises a resonant frequency; and
   the antenna has an actual length and an effective electrical length, the effective electrical length being selected for the desired electronic operating parameter, the forming of the matrix material effectively changing the effective electrical length of the antenna.

13. The method of claim 9, wherein:
   the desired electronic operating parameter comprises a resonant frequency; and
   the antenna has an actual length and an effective electrical length, the effective electrical length being selected for the desired electronic operating parameter, the forming of the matrix material effectively lengthening the effective electrical length of the antenna.

14. The method of claim 9, wherein the antenna includes an exposed outer surface and the forming of said matrix material comprises forming said matrix material over all of the exposed outer surface.

15. The method of claim 9, wherein the desired electronic operating parameter comprises a resonant frequency in a range from between about 1 GHz to 30 GHz.

16. The method of claim 9, wherein the desired electronic operating parameter comprises a resonant frequency of approximately 2.45 GHz.

17. The method of claim 9, wherein the at least one desired filler material comprises calcium carbonate.

18. The method of claim 9, wherein the at least one desired filler material is selected from the group consisting of: polyimide, $SiO_2$ fluoropolymer, glass, titanium dioxide, calcium carbonate, calcium sulfate, and micro glass balloons.

19. A method of forming an electromagnetic radiation signal passing device comprising the following steps:
   providing an integrated circuit;
   providing a power source for the integrated circuit;
   providing at least one electromagnetic radiation signal passing antenna associated with the integrated circuit, the antenna having an outer surface;
   operably connecting the integrated circuit, power source and antenna; and
   covering the antenna outer surface with a solid material matrix comprising a suspension of solid particles, the solid particles being selected to adjust an electronic operating parameter of the antenna.

20. The method of claim 19, wherein the antenna is configured to transmit microwave backscatter.

21. The method of claim 19, wherein the covering of the antenna outer surface adjusts an electronic operating parameter comprising a resonant frequency of the antenna.

22. The method of claim 19, wherein:
   the connecting of the integrated circuit, power source and antenna comprises supporting the same relative to a substrate; and
   the covering of the antenna outer surface comprises:
      forming a flowable material over the substrate; and
      curing the flowable material to provide the solid material matrix.

23. The method of claim 19, wherein:
   the connecting of the integrated circuit, power source and antenna comprises supporting the same relative to a substrate; and
   the covering of the antenna outer surface comprises:
      forming a flowable material over the substrate; and
      curing the flowable material to provide the solid material matrix, wherein the solid particles comprise calcium carbonate.

24. The method of claim 19, wherein:
   the connecting of the integrated circuit, power source and antenna comprises supporting the same relative to a substrate; and
   the covering of the antenna outer surface comprises:
      forming a flowable material over the substrate; and
      curing the flowable material to provide the solid material matrix, wherein the solid particles are selected from the group consisting of: polyimide, $SiO_2$, fluoropolymer, glass, titanium dioxide, calcium carbonate, calcium sulfate, and micro glass balloons.

25. The method of claim 19, wherein the covering of the antenna outer surface adjusts an electronic operating parameter comprising a resonant frequency of the antenna, the adjusted resonant frequency being in a range from between about 1 GHz to 30 GHz.

26. The method of claim 19, wherein:
   the connecting of the integrated circuit, power source and antenna comprises supporting the same relative to a substrate; and
   the covering of the antenna outer surface comprises:
      forming a flowable material over the substrate; and
      curing the flowable material to provide the solid material matrix, wherein:
   the solid particles are selected from the group consisting of: polyimide, $SiO_2$, fluoropolymer, glass, titanium dioxide, calcium carbonate, calcium sulfate, and micro glass balloons; and
   the covering of the antenna outer surface adjusts an electronic operating parameter comprising a resonant frequency, the adjusted resonant frequency being in a range from about between 1 GHz to 30 GHz.

27. A method of forming a radio frequency identification device comprising the following steps:
   providing an integrated circuit comprising radio frequency transmitting and receiving circuitry;
   providing a battery power source for the integrated circuit;
   providing at least one radio signal passing antenna associated with the transmitting and receiving circuitry, the antenna having an outer surface;
   operably connecting the integrated circuit, battery power source and antenna;
   covering the antenna outer surface with a flowable material comprising a suspension of solid particles, the solid particles being selected to affect the frequency at which the antenna resonates; and
   curing the flowable material into a hardened antenna coating.

28. The method of claim 27, wherein the solid particles comprise calcium carbonate.

29. The method of claim 27, wherein the solid particles are selected from the group consisting of: polyimide, $SiO_2$, fluoropolymer, glass, titanium dioxide, calcium carbonate, calcium sulfate, and micro glass balloons.

30. The method of claim 27, wherein the antenna resonates at a frequency from between 1 GHz to 30 GHz.

31. The method of claim 27, wherein the antenna resonates at a frequency of about 2.45 GHz.

32. The method of claim 27, wherein the antenna has an actual length and an effective electrical length, the effective electrical length characterizing an antenna resonant frequency, and wherein the covering of the antenna increases the effective electrical length of the antenna relative to the actual length of the antenna.

33. A method of manipulating resonance characteristics of an elongated antenna comprising:
   providing an elongated antenna having an actual length and an outer surface; and
   covering at least a portion of the antenna outer surface with a solid material matrix comprising a suspension of solid particles, the solid particles being selected to achieve an effective antenna electrical length which is greater than the antenna actual length, the antenna electrical length being associated with resonance characteristics which are different from those associated with the antenna actual length.

34. The method of claim 33, wherein:
   the providing of the elongated antenna comprises forming the antenna relative to a substrate; and
   the covering of the antenna comprises forming a flowable material over the substrate and curing the flowable material to provide the solid material matrix.

35. A method of forming a radio frequency transmitting/receiving card comprising:
   providing an antenna having a first length which is less than a desired second length, the second length being characterized by a desired resonant frequency, the antenna having an outer surface;
   covering at least a portion of the antenna outer surface with a solid material matrix comprising a suspension of solid particles, the solid particles being selected to comprise a material, volume and density within the matrix effective to increase the first length to an effective length substantially equal to the desired second length and to achieve the desired resonant frequency for operable passage of radio frequency signals; and
   packaging the antenna with integrated circuitry coupled operatively therewith to form a radio frequency receiving/transmitting card having a thickness no greater than about 90 mils.

36. The method of claim 35, wherein the thickness is no greater than about 40 mils.

37. The method of claim 35, wherein the thickness is greater than about 30 mils.

38. The method of claim 35, wherein the second length is effective to resonate the antenna at a frequency between 200 MHz and 10 GHz.

39. The method of claim 35, wherein the solid particles comprises calcium carbonate.

40. The method of claim 35, wherein the solid particles are selected from the group consisting of: polyimide, $SiO_2$, fluoropolymer, glass, titanium dioxide, calcium carbonate, calcium sulfate, and micro glass balloons.

41. The method of claim 35, wherein the card is configured for transmitting microwave backscatter relative to received microwave radiation.

42. The method of claim 35, wherein:
   the antenna comprises a loop antenna; and
   the packaging of the antenna with the integrated circuitry defines a radio frequency receiving/transmitting card having an outer periphery, at least a substantial portion of the antenna being disposed inside the outer periphery.

43. A method of forming a radio frequency receiving/transmitting device comprising:
   providing an integrated circuit configured for processing radio frequency signals;
   operatively coupling a battery with the integrated circuit;
   providing an elongate antenna operatively connected with the integrated circuit and configured for receiving/transmitting radio frequency signals;
   providing a matrix material;
   selecting at least one desired filler material and adding the filler material to the matrix material to form a coating material;
   forming the coating material over at least a portion of the antenna, wherein the filler material is selected to manipulate an electronic operating characteristic of the radio frequency receiving/transmitting device; and
   packaging the integrated circuit, battery, and antenna in a package to form the radio frequency receiving/transmitting device.

44. The method of claim 43, wherein:
   the packaging of the integrated circuit, battery, and antenna defines a package perimetral edge region; and
   the elongate antenna comprises a loop antenna at least a portion of which extends inside the perimetral edge region.

45. The method of claim 43, wherein:
   the packaging of the integrated circuit, battery, and antenna defines a package perimetral edge region; and
   the elongate antenna comprises a loop antenna which extends entirely inside the perimetral edge region.

46. The method of claim 43, wherein the electronic operating characteristic comprises an effective electrical length of the antenna.

47. The method of claim 43, wherein the electronic operating characteristic comprises an electrical length of the antenna the manipulation of which increases the electrical length thereof.

48. The method of claim 43, wherein the device comprises a card having at least one generally planar surface and wherein the packaging of the integrated circuit, battery, and antenna in the package defines a package having a thickness transverse the planar surface of less or equal to about 90 mils.

49. A radio frequency transmitting/receiving device comprising:

- integrated circuitry configured for processing radio frequency signals;
- a battery operatively coupled with the integrated circuitry, the battery having an outer perimeter;
- an elongate antenna operatively coupled with the integrated circuitry for transmitting/receiving radio frequency signals, a substantial portion of the antenna being disposed proximate the outer perimeter of the battery;
- coating material including at least one type of filler material selected to manipulate an electronic operating characteristic of the radio frequency transmitting/receiving device, the coating material being disposed over at least a portion of the antenna; and
- packaging material formed over the integrated circuitry, battery, and antenna and encapsulating the same to form the radio frequency transmitting/receiving device having a thickness no greater than about 30 mils.

* * * * *